July 9, 1968    G. PLURA    3,391,833
APPARATUS FOR CONVEYING IN DRY CONDITION
AND DOSING ADHESIVE MATERIALS
Filed Jan. 13, 1967
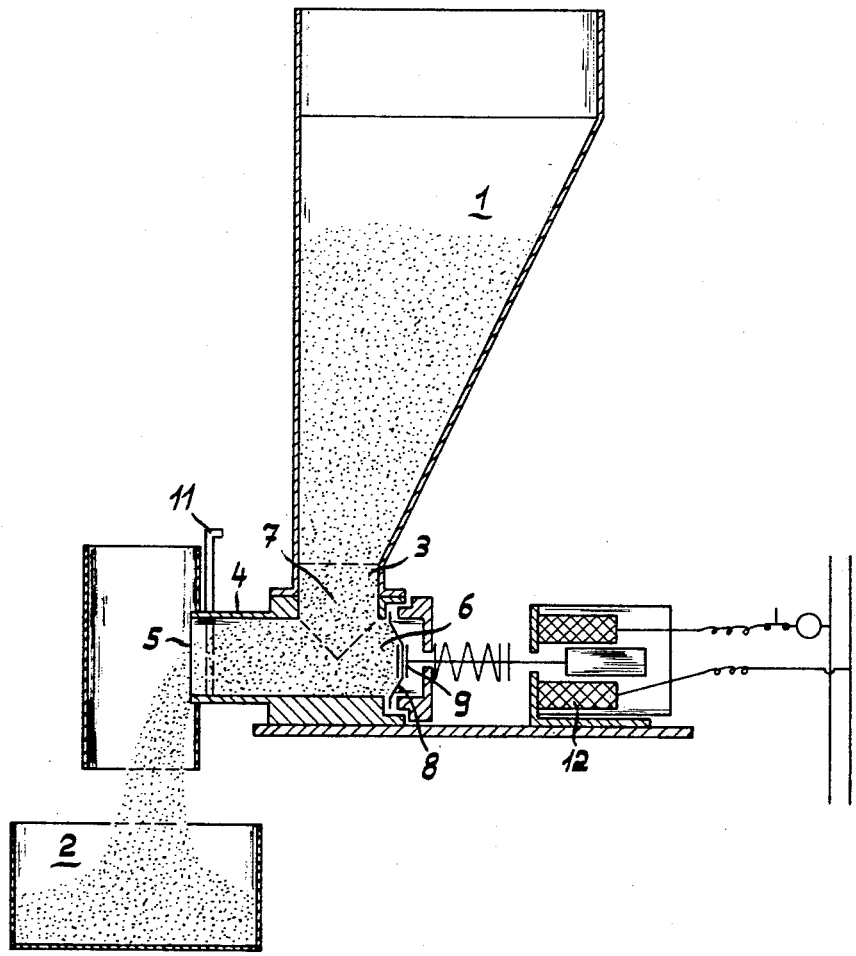
INVENTOR:
Georg Plura
By
Walter Becker

United States Patent Office 3,391,833
Patented July 9, 1968

3,391,833
APPARATUS FOR CONVEYING IN DRY CONDITION AND DOSING ADHESIVE MATERIALS
Georg Plura, Gummersbach, Germany, assignor to L. & C. Steinmuller G.m.b.H., Gummersbach, Germany
Filed Jan. 13, 1967, Ser. No. 609,020
5 Claims. (Cl. 222—200)

ABSTRACT OF THE DISCLOSURE

The invention concerns an apparatus for conveying in dry condition, adhesive materials, for instance, magnesium oxide and dosing the same. To this end, the material is discharged from a funnel-shaped hopper into a preferably horizontal pipe, one end of which is normally open for dispensing the material received by the pipe from the hopper, whereas the other end is tightly closed by a diaphragm reciprocable by a piston.

---

The present invention relates to an apparatus for conveying in dry condition adhesive materials, for instance magnesium oxide, and dosing the same. With adhesive substances, there is encountered the difficulty that the same, when being conveyed, will on their way from the storage container to the place of consumption get stuck to the walls of the conveying devices and conveying conduits and clog up the same after a short period of operation. This difficulty is particularly inherent to magnesium oxide.

It is, therefore, an object of the present invention to overcome these drawbacks inherent to adhesive substances, especially magnesium oxide.

It is another object of this invention to provide a device for conveying in dry condition and dosing adhesive substances which will be free from a clogging up of the conveying conduits even when the material contains granular sizes in excess of the normal dimensions.

These and other objects and advantages of the invention will appear more clearly from the following specification in connection with the accompaning drawing diagrammatically illustrating a longitudinal section through an apparatus according to the invention.

The apparatus according to the present invention is characterized primarily in that an asymmetric funnel-shaped storage container is provided which has a preferably cylindrical outlet section for the material to be conveyed which outlet section leads into a transporting pipe, for instance of synthetic material, the axis of said pipe being substantially horizontal or forming an angle with the axis of said cylindrical outlet section. One end of said transporting pipe is open while the other end in the vicinity of the funnel mouth is tightly closed by a diaphragm, for instance a rubber diaphragm, with a disc piston. The piston is adapted to carry out a high speed reciprocatory movement as a result of which the volume of the interior of the pipe will with each working cycle pulsate by the product of the pipe cross section and the stroke. At the start of the feeding stroke, the material which has dropped out of the funnel into the transporting pipe is compacted, and a volume corresponding to the residual stroke is fed to the exit opening. As drive for the feeding piston a drive may be employed by means of which the piston movement effecting the transfer of the adhesive material can be carried out. Advantageously, a solenoid can be used for this purpose.

The device according to the present invention has the advantage over heretofore known conveying and distributing devices for pourable goods that a clogging up of the conveying conduits can no longer occur even if the goods contain granular sizes in excess of the normal dimensions of the granular material.

Another advantage of the device according to the present invention consists in that by reducing the number of strokes, the conveying output can be adjusted for very small conveying quantities.

Referring now to the drawing in detail, the device shown therein comprises a storage container 1 adapted to receive pourable material, as for instance magnesium oxide, for transfer into a collecting container 2. The asymmetric funnel-shaped storage container 1 has a cylindrical mouth 3 leading into a horizontal pipe 4 of synthetic material. As will be seen from the drawing, the left-hand side 5 of pipe 4 is open, whereas the right-hand side 6 located near the discharge opening 7 of mouth 3 is tightly closed by a rubber diaphragm 8 with a disc piston 9. Pipe 4 serving as conveying pipe may at its open side 5 be closed, for instance, by means of a gate 11. The movement of the disc piston 9 which initiates the transfer of the adhesive material may advantageously be effected by a relay-controlled magnet 12.

By employing a diaphragm piston 9 adapted to be controlled as to its stroke, in combination with the horizontally extending pipe 4, it will be assured that continuously a metered quantity of magnesium oxide, even if strongly adhesive, will be conveyed without difficulties from the storage container 1 into the collecting container 2.

It is, of course, to be understood that the present invention is, by no means, limited to the particular embodiment shown in the drawing but also comprises any modifications within the scope of the appended claims.

What I claim is:
1. An apparatus for conveying an adhesive substance, especially magnesia, in dry condition and for dispensing said substance which includes: funnel-shaped container means for receiving the adhesive substance to be conveyed and having a first opening at the bottom, substantially horizontal conveying pipe means below said funnel-shaped container means and having a second opening in the top communicating with said first opening, the central axis of said funnel-shaped container means extending upwardly at an angle to the axis of said conveying pipe means, one end portion of said conveying pipe means being open for releasing substance therefrom which has been received in said pipe means from said funnel-shaped container means via said openings, diaphragm means arranged on the other end portion of said pipe means and tightly closing said other end portion, said openings being located nearer to said other end portion of said pipe means than to said one end portion thereof, and reciprocable piston means connected to said diaphragm means and operable to vibrate the latter in the direction of the axis of said pipe means for imparting discharge impulses upon the substance in said pipe means thereby to move the substance in the pipe means toward and out of said one end portion thereof.

2. An apparatus according to claim 1, in which said piston means includes a disc piston.

3. An apparatus according to claim 1, which includes magnetic means for actuating said piston means.

4. An apparatus according to claim 1, which includes gate means arranged at said one end of said pipe means for selectively closing said one end portion.

5. An apparatus according to claim 1, in which said funnel-shaped means has an asymmetric shape.

References Cited

UNITED STATES PATENTS

| | | | |
|---|---|---|---|
| 1,570,795 | 1/1926 | Tainton | 222—200 X |
| 2,423,110 | 7/1947 | Mosshart | 222—200 X |
| 2,849,159 | 8/1958 | Kaufmann | 222—383 X |
| 3,221,798 | 12/1965 | Kofink | 103—53 X |
| 2,484,985 | 10/1949 | Doud et al. | 291—23 |

STANLEY H. TOLLBERG, *Primary Examiner*.